United States Patent [19]
Ottersen et al.

[11] 4,186,764
[45] Feb. 5, 1980

[54] VALVE FOR CONTROLLING LIQUID FLOW

[75] Inventors: Odd Ottersen; Egil S. Solvang, both of Oslo, Norway; Endre Røsjø, London, England

[73] Assignee: Ole Gunnar Selvaag, Oslo, Norway

[21] Appl. No.: 818,198

[22] Filed: Jul. 22, 1977

[30] Foreign Application Priority Data

Jul. 22, 1976 [NO] Norway .................................. 762569

[51] Int. Cl.² ............................................. F16K 31/18
[52] U.S. Cl. ........................................ 137/414; 137/436; 137/443; 137/451; 251/46; 251/61.1
[58] Field of Search ............... 137/414, 436, 442, 443, 137/451; 251/5, 61.1, 45, 46, 325

[56] References Cited
U.S. PATENT DOCUMENTS

| | | | |
|---|---|---|---|
| 2,724,405 | 11/1955 | Stover | 251/61.1 |
| 3,074,684 | 1/1963 | Doyle | 137/414 |
| 3,429,333 | 2/1969 | Schoepe et al. | 137/414 |
| 3,865,131 | 2/1975 | Jacobson | 137/414 |
| 4,072,164 | 2/1978 | Kaden | 251/46 |

FOREIGN PATENT DOCUMENTS

| | | | |
|---|---|---|---|
| 1133634 | 7/1962 | Fed. Rep. of Germany | 137/414 |
| 1149688 | 12/1957 | France | 251/61.1 |
| 644039 | 10/1950 | United Kingdom | 251/61.1 |

*Primary Examiner*—Martin P. Schwadron
*Assistant Examiner*—G. L. Walton
*Attorney, Agent, or Firm*—Larson, Taylor and Hinds

[57] ABSTRACT

A valve is provided for controlling fluid flow between the inlet and outlet of a closed valve housing. A stationary insert body in the housing includes a through channel with cross channels extending transversely therefrom. The latter open on the inner side of an expansible U-shaped ring which surrounds the periphery of the insert body and is spaced from the wall of the valve housing. A piston is movable to close the outlet of the through channel so as to increase the pressure in the cross channels and cause expansion of the ring to close off the passage around the insert body between the inlet and outlet.

6 Claims, 3 Drawing Figures

VALVE FOR CONTROLLING LIQUID FLOW

The present invention relates to a valve for controlling liquid flow from an inlet of a closed valve housing to an outlet thereof.

The valve according to the invention is preferably used in cisterns, where the closing and the opening of the valve is caused by a float suitably arranged in said cistern. It should however be understood that the use of the valve according to the invention in no way is limited to cisterns.

The abovementioned valve is characterized according to the invention by the features appearing from the attached claims as well as from the description hereinafter of an embodiment with reference to the drawings.

Figure 1:
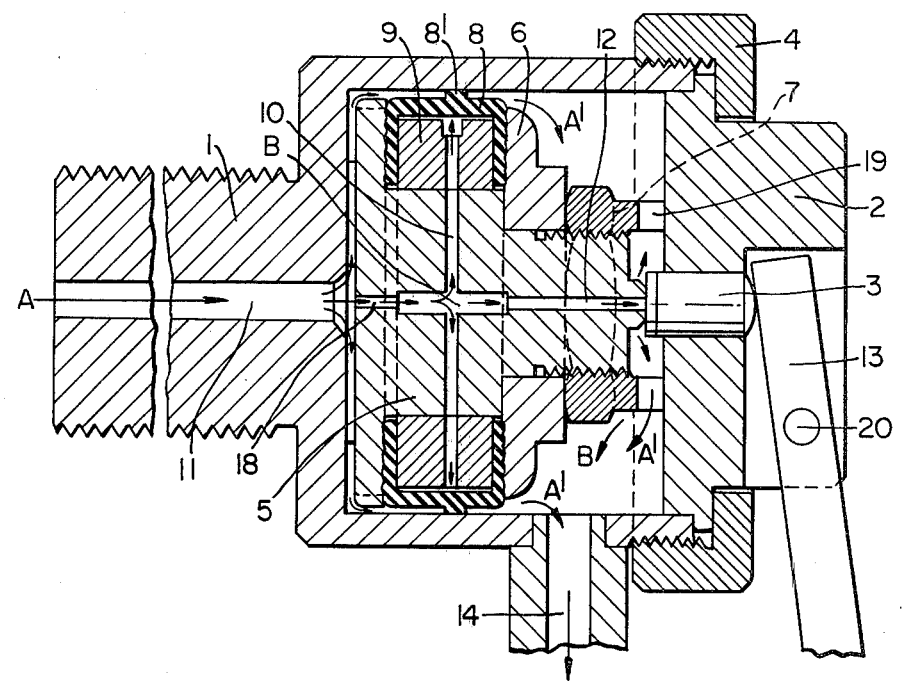
FIG. 1 is a section through an embodiment of the valve according to the invention.

The valve according to FIG. 1 has a structure which will appear from the description hereinafter of its operation. In its closed state, as shown in FIG. 1, a servo piston 3 will close a narrow channel 12 and cause a so-called control flow B through the channel to cease. In said closed state the pressure in a valve insert 5 will increase and by means of channels 10 and a groove in a supporting ring 9 will be propagated to the inner periphery of a rubber gasket 8 to cause said gasket to be pressed outwardly toward the inside of the housing 1 and thus prevents the main fluid flow A' to continue. This is due to the fact that the pressure area of the main fluid flow on the outside of the rubber gasket 8 is less than the pressure area of the servo fluid flow at the inside of the rubber gasket, i.e. due to the positioning of a bead 8' on said gasket.

Figure 2:
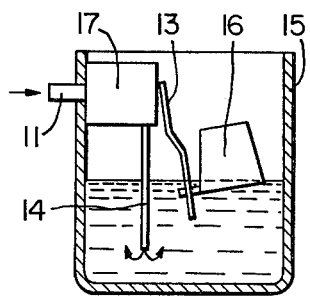
FIG. 2 shows in a schematic manner the inventive valve mounted in a system.

The opening of the valve 17 (FIG. 2) takes places when the float 16 moves downwardly due to release of fluid from the cistern 15. The servo piston 3 which in closed state is pressed by the float arm 13, is released so that the fluid in the channel 12 flows freely.

The fluid pressure within said insert 5 and thus on the rear side of the rubber gasket 8 now decreases sufficiently to let the pressure from the main fluid flow on the outside of the rubber gasket 8 manage to press the fluid between the bead 8' of the rubber gasket 8 and the inside face of the housing 8 and further through an outlet portion 14 down into the cistern 15.

The main fluid flow A' will, as some of the flow passes the servo valve opening at the servo piston 3, create a suction action on the control flow B, in such a manner that the pressure on the rear side of the rubber gasket 8 is further decreased and the main fluid flow A' becomes stable.

The ratio between the diameters of the inlet and outlet channels for the control flow and the positioning of the bead 8' on the outside of the rubber gasket 8 has been found to be of importance for the functioning of the valve. In a preferred but, as regard the invention, not limiting embodiment, the ratio between the diameters of the channels 18 and 12 of FIG. 1 is 0.8/1.3 since simultaneously the diameter of the channels 10 forms the ratio 1.2/1.3 with the diameter of the channel 12. As will appear from FIG. 1 the bead 8' is preferably placed asymmetrically relative to the edges of the rubber gasket 8. The bead 8' may lie adjacent the channels 10 or asymmetrically relative thereto.

The section of the insert 5 lying leftmost in the figure may have a polygonal cross section, e.g. hexagonal.

In FIG. 1 a lid 2 forms a slide passage for the piston 3 and simultaneously suspension of the float arm 13. The nut 4 causes clamping of the inserts inside the valve housing 1 as well as attachment of the lid 2 thereto. A clamp disc 6 is provided with grooves for the rubber gasket 8 and is held in place by a nut 7, said nut 7 being provided with grooves 19 for fluid flow from the servo valve, i.e. control flow. Supply A of fluid passes through the inlet pipe 11. With valve open there are mainly two fluid flows, A'+B, with A' passing past the bead 8', and B passing through the channels 18 and 12.

Figure 3:
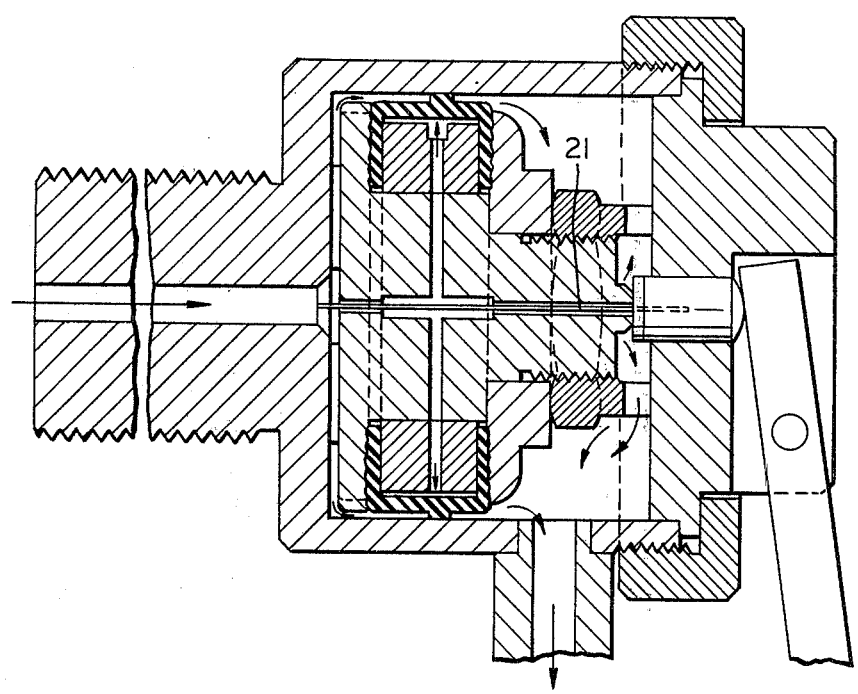
Fig. 3 is a modification of the embodiment of FIG. 1.

In the embodiment of FIG. 3 a needle 21 has been arranged which almost fills the channels of the control flow, preferably with a diametric tolerance gap of 0.05–0.1 millimeter. The needle 21 will, because it almost closes for the control flow to the rear side of the rubber gasket 8, provide a softer closing of the valve, i.e. will prevent shock and knocks. Because the needle will move in a reciprocating manner in the bore simultaneously with any movement of the servo piston, the control flow channel may more easily be kept open and free from pollution.

As will be understood the invention has provided a valve which is compact and solid, and has a structure which enables efficient functioning with a minimum of movable parts, which in turn make the valve particularly safe in operation. It is thus only the small piston 3 with its very small stroke and the gasket ring 8 which upon extention and contraction, respectively carries out normal mechanical movement.

Within the frame of the claims hereinafter the valve according to the invention may be modified both with respect to dimensioning of the individual parts incorporated in the valve as well as the means for causing the opening and closing of the valve.

We claim:

1. A valve for controlling the fluid flow from an inlet of a closed valve housing to an outlet thereof, characterized in that between said inlet and said outlet there is arranged at a distance from the inside of the housing a stationary insert body, through which there extends from said inlet a through channel and from said through channel extend transversely extending cross channels, which open at the inner side of at least one elastic annular ring having a pair of radially inwardly extending legs, said ring surrounding the periphery of the insert body such that said ring, in its inactive position, is spaced from the wall of the valve housing so as to enable flow around said insert between said inlet and outlet of the valve, and a piston which is a sliding close fit through the wall of the valve housing in such a manner that the piston may be brought to lie in sealing engagement against the outlet of the through channel thereby closing said outlet of said through channel, which closing of the through channel outlet will increase the pressure in said channel and thus also in said transverse channels, whereby the pressure against the inner side of the annular ring is increased and said ring is brought to a fluid-tight engagement with the inside of the valve housing, thus preventing any connection between the said inlet and said outlet of the valve, said ring having a U-shaped cross section and said transverse channels opening in between the radially inwardly extending legs of the U, said ring being provided with a surrounding contact bead and said valve housing comprising a unitary cylindrical hollow body closed at one end by a lid which serves to fix said insert body in place and which includes a passage therein for said piston.

2. A valve as claimed in claim 1, characterized in that the ring is clamped to the said insert by means of a clamp disc and a clamp nut and is maintained in the desired profile by a separate supporting ring.

3. A valve as claimed in claim 1, characterized in that said piston is operated by a lever connected to a float.

4. A valve as claimed in claim 1, characterized in that the through channel is provided with sections having different cross sectional areas both upstream and downstream the transverse channels.

5. A valve as claimed in claim 4, characterized in that the diameters of the inlet and outlet channel sections have a mutual ratio of 0.8/1.3 and that the ratio between the outlet channel section and the transverse channels is 1.2/1.3.

6. A valve as claimed in claim 1, characterized in that said piston is provided with a needle extending along the through channel of the insert body.

* * * * *